(12) United States Patent
Gosz et al.

(10) Patent No.: US 7,207,789 B2
(45) Date of Patent: Apr. 24, 2007

(54) PROFILED MOTION AND VARIABLE FILL POSITION OF MOLD PLATE ASSEMBLY IN A FOOD PRODUCT MOLDING MACHINE

(75) Inventors: Rick G. Gosz, Oshkosh, WI (US); Mark A. Kubsh, Francis Creek, WI (US)

(73) Assignee: Patriot Universal Holdings, LLC., Hilbert, WI (US)

( * ) Notice: Subject to any disclaimer, the term of this patent is extended or adjusted under 35 U.S.C. 154(b) by 0 days.

(21) Appl. No.: 10/978,076

(22) Filed: Oct. 28, 2004

(65) Prior Publication Data

US 2005/0089596 A1  Apr. 28, 2005

Related U.S. Application Data

(60) Provisional application No. 60/515,097, filed on Oct. 28, 2003.

(51) Int. Cl.
 *B29C 47/92* (2006.01)
(52) U.S. Cl. ...................... 425/150; 425/574; 425/575; 425/572; 425/556; 426/513
(58) Field of Classification Search ............... 425/572, 425/574, 575, 556, 150; 426/513, 512; *A22C 7/00*
See application file for complete search history.

(56) References Cited

U.S. PATENT DOCUMENTS 5,980,228 A * 11/1999 Soper ...................... 425/145

\* cited by examiner

*Primary Examiner*—Yogendra N. Gupta
*Assistant Examiner*—Maria Veronica Ewald
(74) *Attorney, Agent, or Firm*—Philip M. Weiss; Weiss & Weiss

(57) ABSTRACT

A mold plate drive assembly configured to provide a variable motion and fill position of the cavity of a mold plate relative to a fill position of a food product forming machine.

13 Claims, 5 Drawing Sheets

PROFILED MOTION AND VARIABLE FILL POSITION OF MOLD PLATE ASSEMBLY IN A FOOD PRODUCT MOLDING MACHINE

RELATED APPLICATIONS

The present application claims priority to provisional patent application Ser. No. 60/515,097, filed Oct. 28, 2003.

FIELD OF THE INVENTION

This invention relates generally to a mold plate drive assembly for a food product molding machine. More specifically, the invention relates to a mold plate drive assembly configured to provide a variable motion and fill position of the cavity of a mold plate relative to a fill position of a food product forming machine.

BACKGROUND OF THE INVENTION

Before automation, consumers generally formed patties of food product by hand. However, demand (e.g., the fast-food industry) for high-speed and high-volume product of food products led to the development of automated machines configured to provide molded food product. Generally, such machines mold the food product under pressure into patties of various shapes and sizes. A typical application for food product molding machines is in the production of hamburger patties. Yet, the type of food product (e.g., vegetables, meat, fish, etc.) and shape (e.g., rods, patties, etc.) can vary. The molded food products are distributed to restaurants, grocery stores, etc. The demand for high volume, high-speed food product molding machinery continues to grow.

However, prior art food product molding machines have several drawbacks. For example, known molding machine use hydraulic or mechanical crank systems to reciprocate the lateral back and forth motion of a mold plate from a fill position over a fill position of fill plate of the food product forming machine. These hydraulic and mechanical crank systems are cumbersome to control and do not provide consistent compaction of food product patties. Furthermore, finding the optimum fill position of a mold plate requires machining new fill positions into a fill plate, or producing several fill plates and replacing the fill plates as needed according to the characteristics of the product being molded.

As can be seen, the present state of the art of mold drive assemblies incorporated into food product molding machines has definite shortcomings.

SUMMARY OF THE INVENTION

In accordance with the present invention, there is provided a food product molding machine comprising a fill plate having one or more fill positions and a mold plate having a plurality of cavities configured to receive a food product from the fill positions of the fill plate. A mold plate drive assembly is configured to linearly reciprocate the mold plate to and from a fill position over the fill slots. The food product molding machine further includes controller configured to control operation of the mold plate drive assembly to cause the cavities of the mold plate to stop at a plurality of selective positions relative the fill slots of the fill plate.

It is an object of the present invention to fix the mold plate speed. It is an object of the present invention to eliminate pause time. It is an object of the present invention to optimize machine speed. It is an object of the present invention for the mold plate to go into the fill position by decelerating versus stopping. It is an object of the present invention to provide a longer deceleration to the midpoint to the endpoint.

DETAILED DESCRIPTION OF THE PREFERRED EMBODIMENTS

Accordingly, the present invention provides a food product molding machine having a mold plate drive system that includes a mold plate drive belt assembly.

Figure 1:
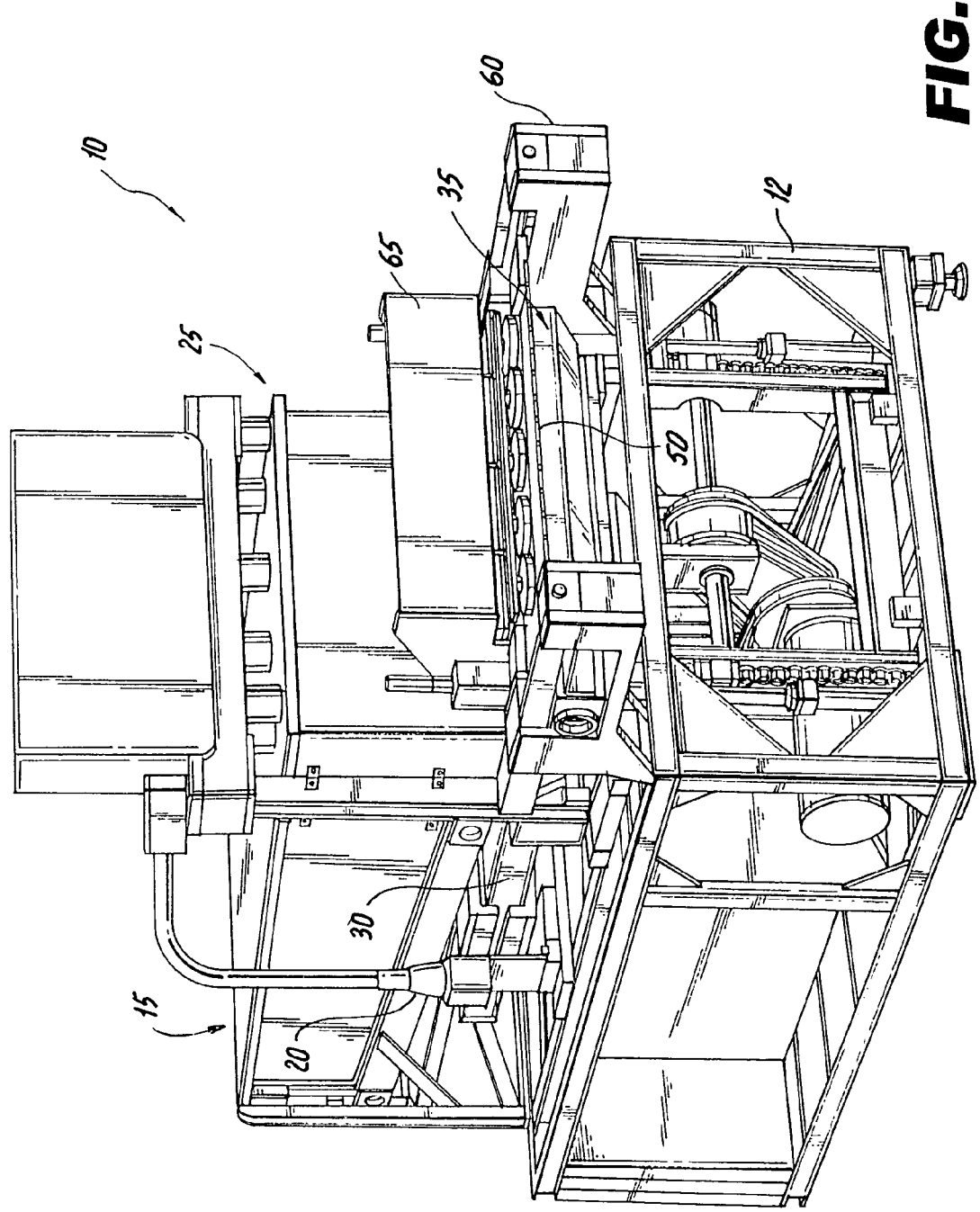
FIG. 1 is a perspective view of one embodiment of a food product molding machine in accordance with the present invention.

FIG. 1 shows one embodiment of the food product molding machine 10 of the present invention. The machine 10 generally includes a frame 12 that supports a food hopper 15 and a conveyor assembly 20 configured to deliver a supply of food product to an auger assembly 25. The auger assembly 25 regulates the supply of the food to a pump system. The pump system includes a series of plunger assemblies 30 configured to pressurize or force the food product through a feed chamber/manifold assembly 35 and into a cavity 37 of a mold plate 50. The pressure applied by the plunger assemblies 30 regulates the compression of the food product in the cavity 37 of the mold plate 50.

A mold plate drive belt system 60 reciprocates the mold plate 50 between a fill position and a discharge position. At the fill position, the mold plate drive system 60 moves the mold plate 50 in alignment over a fill position 62 of a fill plate 63 to receive the pressurized food product into the plurality of cavities 37 in the mold plate 50. A mold cover and a breather plate (not shown) enclose the cavities 37 of the mold plate 50 when mold plate 50 is positioned over the fill position 62. After filling the cavities 37 of the mold plate 50 with food product fed under pressure from the feed chamber/manifold assembly 35, the mold plate drive system 60 slides the mold plate 50 outward from alignment with the fill position 62 toward the discharge position. At the discharge position, a knockout assembly 65 separates the one or more formed food product patties from the mold plate 50, typically deposited the formed patties onto an underlying conveyor. The number and rows of fill positions 62 in the fill plate 63 can vary.

Figure 2:
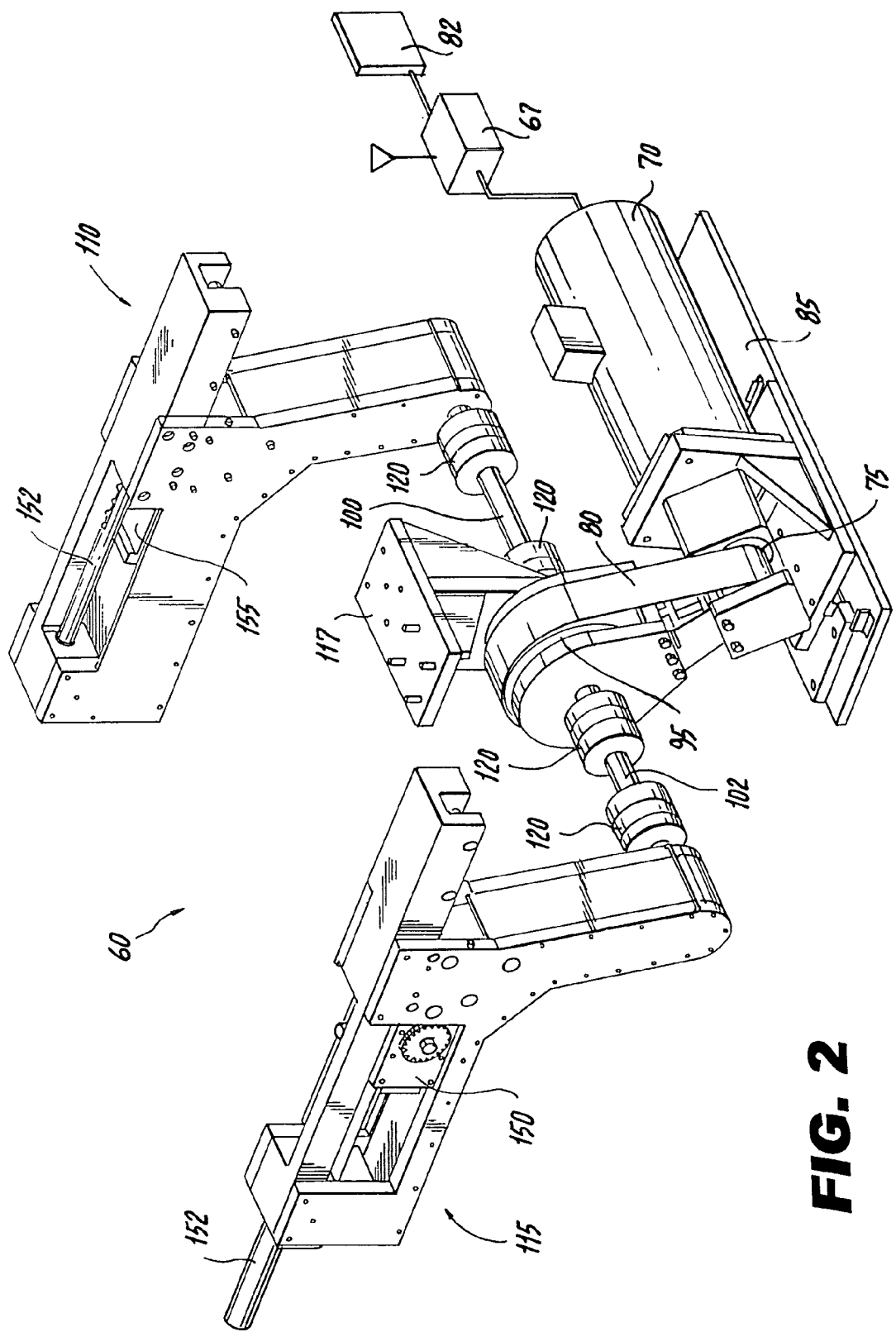
FIG. 2 is a perspective of the mold plate drive assembly removed from the machine 10 shown in FIG. 1.

FIG. 2 shows a detailed view of the mold plate drive assembly 60 of the machine 10 of FIG. 1. The mold plate drive assembly 60 includes a controller 67 electrically connected to a motor 70. The motor 70 is coupled to a drive pulley 75 that is configured to variably drive rotation of a drive belt 80. The controller 67 includes a touch screen or other input/output device 82 operable to allow an operator to input information or read output information from the controller 67. The motor 70 is preferably a servo motor configured to receive control signals from a controller 67.

Based on control signals from the controller 67, the servo motor 70 drives the cyclic reciprocation of the mold plate 50 between the fill position and the discharge position. The motor 70 and the drive pulley 75 are centrally disposed underneath the feed chamber assembly/manifold assembly 35 for ready access for maintenance or repair. The motor 70 is coupled by a mounting bracket 85 to the frame 12 of the machine 10 by a plurality of fasteners (e.g., bolts, screws, spot-welds, etc.). The type of drive belt 80 can vary.

The drive belt 80 drives rotation of a driven pulley 95. A belt guard 97 encloses the drive belt 80. The driven pulley 95 is coupled to one end of a first shaft 100 and one end of a second shaft 102 extending laterally toward opposite sides of the machine 10. The other end of the first shaft 100 is coupled to a first drive cartridge 110 disposed on one side of the machine 10. The other end of the second shaft 102 is coupled to a second drive cartridge 115 disposed on the opposite side of the machine 10. Each shaft 100 and 102 includes a series of couplers 120 configured to couple each shaft 100 and 105 to the drive cartridges 110 and 115 and to the driven pulley 95. The driven pulley 95 and coupled shafts 100 and 102 are supported by a mounting bracket 117 coupled by fasteners to a main assembly plate 118 that is fixedly attached to the frame 12 of the machine 10.

As shown in FIGS. 1 and 2, each drive cartridge 110 and 115 includes a drive belt 130 under tension by a belt tensioner assembly 150. The belt tensioner assembly 150 provides tensional force on the belt 130. The belt tensioner 150 of each drive cartridge 105 and 110 is coupled to a guide rod 152. The guide rod 152 rides on linear bushings and guides the linear motion of the belt tensioner 150. The cross-sectional shape (e.g., square, circular, etc.) of the guide rod 152 can vary. The guide rod 152 is coupled to a drawbar guide 155, which is defined by the upper area of belt tensioner assembly 150. The drawbar guide 155 is configured to couple with a drawbar 160 disposed laterally between the first 110 and second 115 drive cartridges. The drawbar 160 is coupled to mold plate 50.

In operation, the controller 67 for the mold plate drive assembly 60 receives signals (e.g., radio frequency, electrical pulsed signals, etc.) representative of the position of the mold plate 50. The controller 67 can be configured to receive various signals form pressure sensors, limit switches, etc. representative of the pressure of the food product forced in the cavity of the mold plate 50 or the position of the mold plate 50. The controller 67 includes a processor configured by software to provide control signals to the motor 70 to control the directional drive of the pulley 75. Initially, the motor 70 drives rotation of the drive pulley 75 and attached drive belt 80, drive shafts 100 and 102, and drive pulleys 120 in each drive cartridge 110 and 115 in a first rotational direction to cause the drive belt 130 to move the belt tensioner 150, guide rod 152, drawbar guide 155, drawbar 160, and mold plate 50 to move in a first linear motion toward the fill position 62 of the fill plate 63. Upon filling of the cavity with food product to the designated pressure or for the designated dwell time, the controller signals the motor 70 to change direction. The motor 70 rotates the drive pulley 75 and attached drive belt 80, drive shafts 100 and 102, and drive pulleys 120 in a similar fashion to cause the drive belt 130 to move the belt tensioner 150, guide rod 152, drawbar guide 155, drawbar 160 of each drive cartridge 110 and 115 in a second linear direction such that the mold plate 50 slides away from the fill position 62 and toward a discharge position at the knockout assembly 65. The knockout assembly 65 discharges or releases the formed food product patties from the cavities of the mold plate 50. Thereby, the mold drive assembly 60 drives cyclic reciprocation of the mold plate 50 between the fill position and the discharge position as described above.

Figure 3:
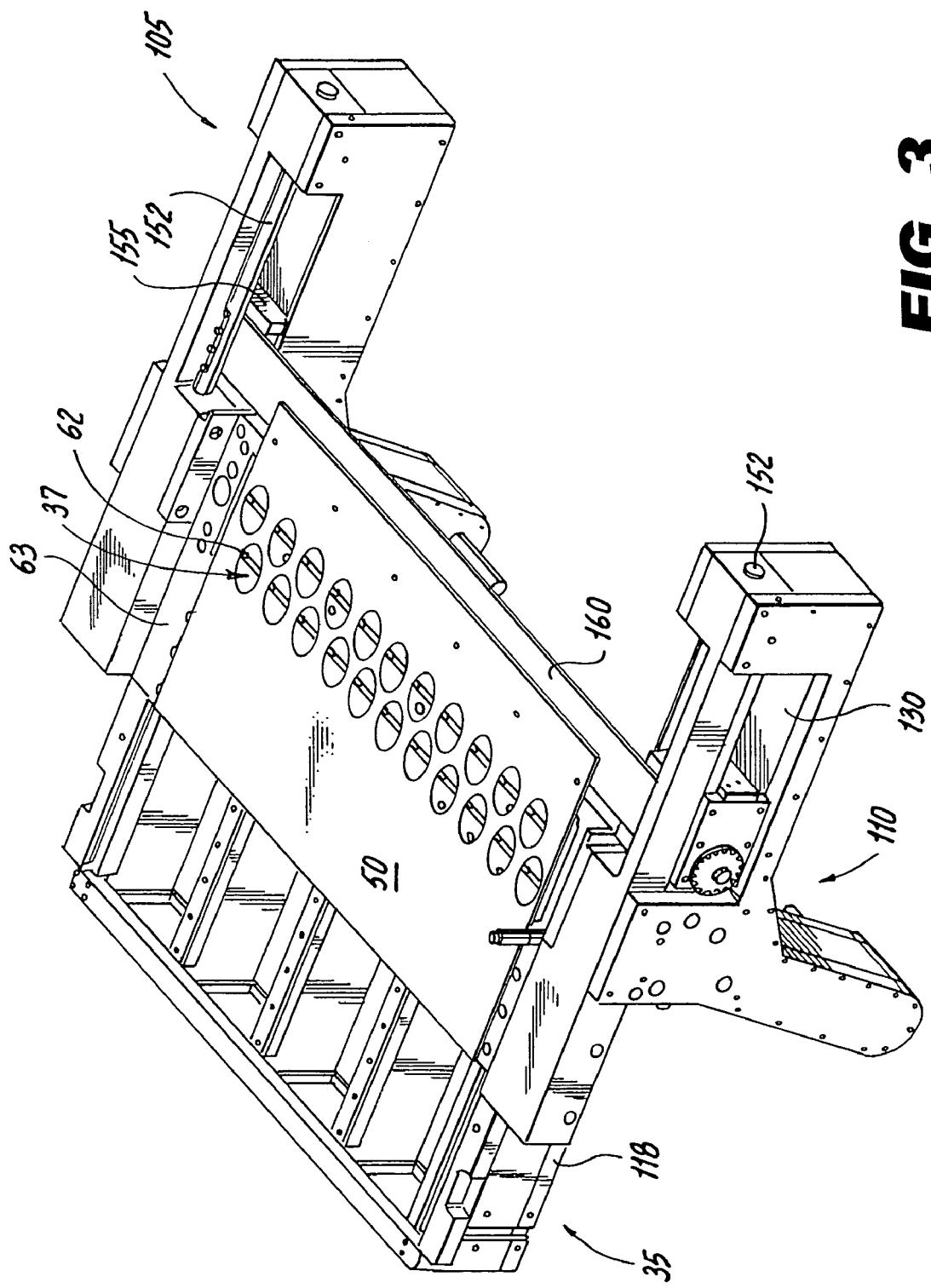
FIG. 3 is a detailed perspective view of a mold plate drive assembly and mold plate of FIG. 1 at a first fill position.
Figure 4:
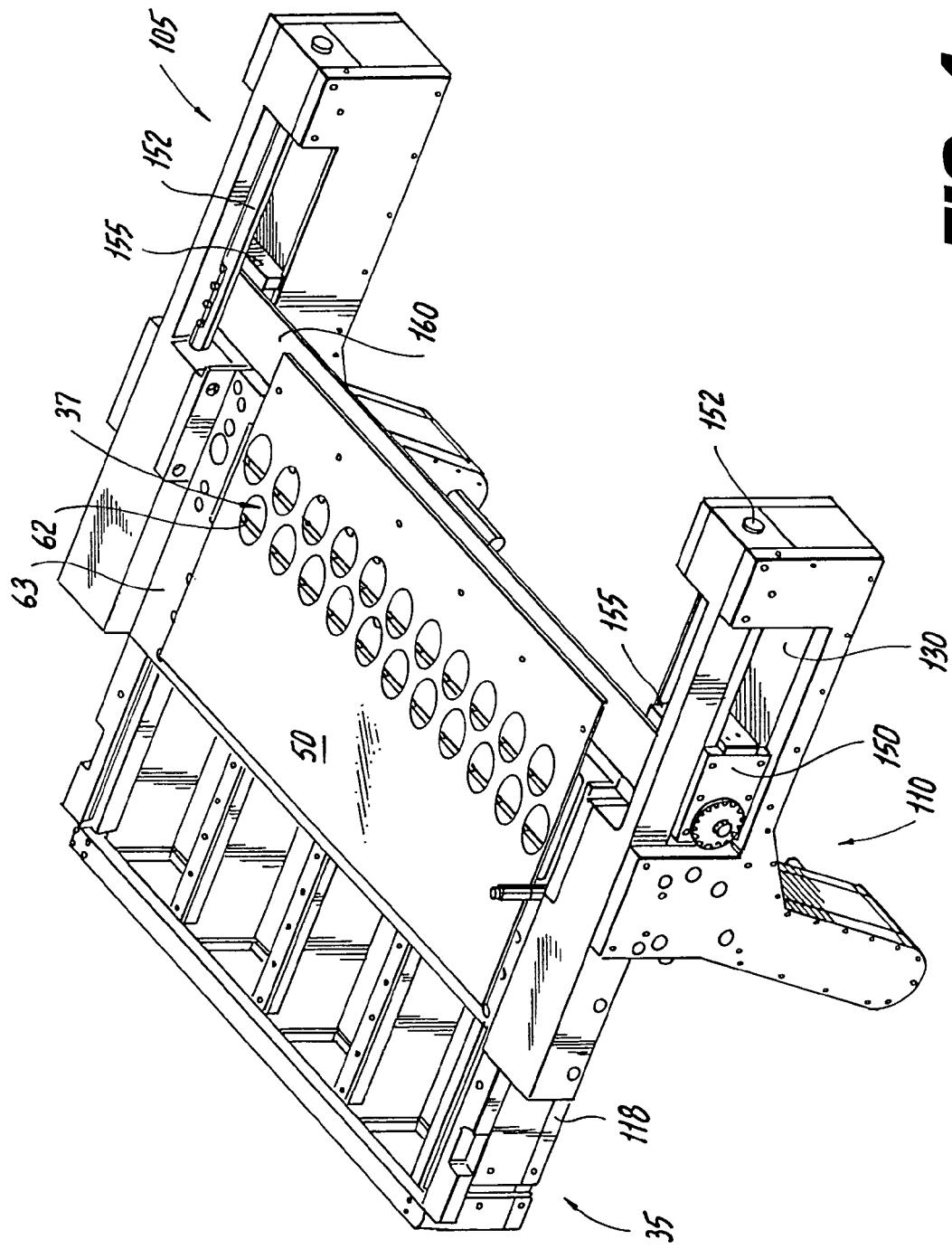
FIG. 4 is a detailed perspective view of a mold plate drive assembly and mold plate of FIG. 1 at a second fill position.
Figure 5:
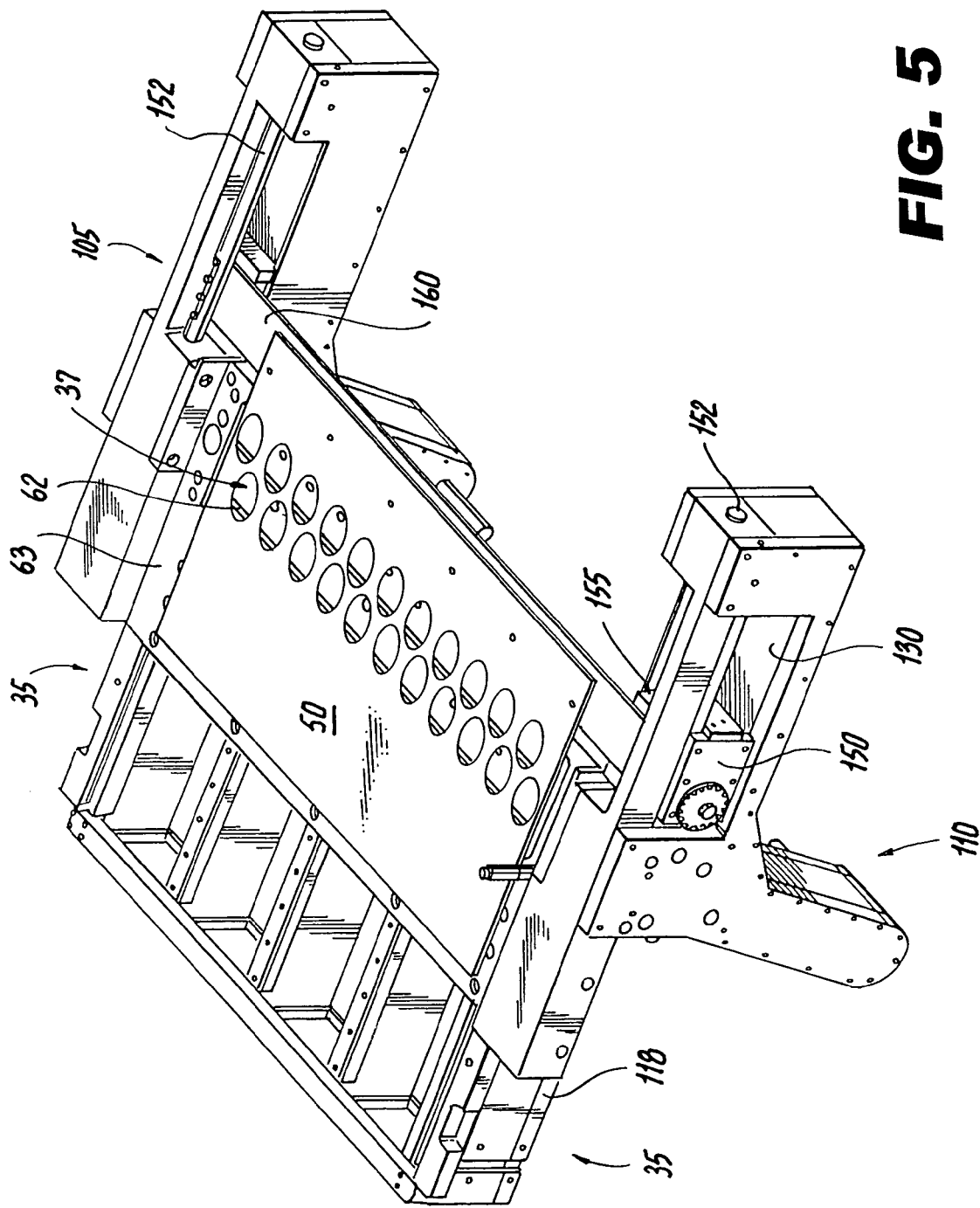
FIG. 5 is a detailed perspective view of a mold plate drive assembly and mold plate of FIG. 1 at a third fill position.

FIGS. 3, 4, and 5 illustrate the mold drive assembly 60 configured by the controller 67 to provide a programmable mold plate position relative to the fill position 62 in the fill plate 63. Each of the FIGS. 3–5 show the mold plate drive assembly 60 stopping the cavities 37 of the mold plate 50 at variable positions relative to the fill positions 62 of the fill plate 63. The location of the cavities 37 over the fill positions 62 affects the filling and compaction of the formed food product patties. The controller 67 includes a touchscreen display 82 to allow an operator to select a fill position relative to the cavities of the mold plate 50.

In FIG. 3, an operator has entered a Mid Cavity Fill Position on the touchscreen 82. The controller 67 signals the mold drive assembly 60 to stop the mold plate 50 such that the fill positions 62 are generally centered in the cavities 37 of the mold plate 50.

In FIG. 4, the operator has entered A Typical Fill Position. The controller 67 signals the mold drive assembly 60 to stop the mold plate 50 such that the cavities 37 are positioned where a typical fill position is located.

In FIG. 5, an operator enters Fully Back Fill Position. The controller 67 signals the drive assembly 60 to stop the mold plate 50 such that the fill positions are positioned at the rear portion of the cavities 37.

The controller 67 can be configured with encoders, pressure sensors, pressure limit switches, etc. to control and determine a position of the mold plate 50 of the machine 10. The controller 67 includes memory to store a plurality of programs for modes of operation of the mold plate drive assembly 60. The controller 67 can also create a program for a mode of operation by stopping the mold plate at small increments (e.g., 0.001 inch) relative the position of the fill positions 62 in the fill plate 63 and determining a compaction and uniformity of the food product fill in the cavities 37 until finding an optimum fill position is determined.

The controller 67 can also operate the drive assembly 60 to index or step the mold plate with each cycle of filling of the cavities 37 with food product, such that the cavities are stopped at multiple positions relative to the fill positions. This index or stepping of the cavities of the mold plate relative to the fill positions can further enhance uniformity and consistency of the formed patty. The index or stepping of the molding plate 50 can occur in either direction of travel of the mold plate 50. In this manner, the mold plate 50 can be repetitively moved back and forth during the filing operation, to enhance the compaction of the material in the cavities 37 of mold plate 50.

The above discussion, examples, and embodiments illustrate our current understanding of the invention. However, since many variations of the invention can be made without departing from the spirit and scope of the invention, the invention resides wholly in the claims hereafter appended.

We claim:

1. A food product molding machine, comprising:
   a fill plate having a plurality of fill positions;
   a mold plate having a plurality of cavities configured to receive a food product from the fill positions of the fill plate; and
   a mold plate drive assembly configured to linearly reciprocate the mold plate to and from a fill position over the fill positions; and
   a controller configured to control operation of the mold plate drive assembly to cause the cavities of the mold plate to stop at a plurality of selective positions relative the fill positions of the fill plate;

wherein said controller stops said mold plate at small increments relative to a position of said fill position and determines a compaction and uniformity of said food product fill in said cavities.

2. The molding machine of claim 1 wherein a mold cover and a breather plate enclose said cavities of said mold plate when said mold plate is positioned over said fill position.

3. The molding machine of claim 1 wherein said controller includes a touch screen or other input/output device for an operator to input information or read output information from said controller.

4. The molding machine of claim 1 wherein said controller receives signals representative of pressure of said food product forced in said cavity of said mold plate or position of said mold plate.

5. The molding machine of claim 1 wherein said controller includes a processor configured by software to provide control signals to a motor which controls a directional drive of a pulley;

said motor driving rotation of said drive pulley in a first rotational direction to move said mold plate in a first linear motion toward a fill position;

wherein upon filling of said cavity with said food product to a designated pressure or dwell time, said controller signals said motor to change direction.

6. The molding machine of claim 5 wherein said motor rotates said drive pulley in a second linear direction such that said mold plate slides away from said fill position and toward a discharge position.

7. The molding machine of claim 1 wherein said mold drive assembly is configured by said controller to provide a programmable mold plate position relative to said fill position.

8. The molding machine of claim 1 wherein said fill position comprises a mid cavity fill position which is obtained when said controller signals said mold drive assembly to stop said mold plate such that said fill positions are centered in said cavities of said mold plate.

9. The molding machine of claim 1 wherein said controller signals said mold drive assembly to stop said mold plate such that said cavities are positioned where a typical fill position is located.

10. The molding machine of claim 1 wherein said controller signals said drive assembly to stop said mold plate such that said fill positions are positioned at a rear portion of said cavity.

11. The molding machine of claim 1 wherein said controller includes memory to store a plurality of programs for modes of operation of said mold plate drive assembly.

12. The molding machine of claim 1 wherein said controller determines an optimum fill position.

13. The molding machine of claim 1 wherein said mold plate can be repetitively moved back and forth during said fill in operation.

* * * * *

(12) EX PARTE REEXAMINATION CERTIFICATE (9621st)
United States Patent
Gosz et al.

(10) Number: US 7,207,789 C1
(45) Certificate Issued: Apr. 30, 2013

(54) PROFILED MOTION AND VARIABLE FILL POSITION OF MOLD PLATE ASSEMBLY IN A FOOD PRODUCT MOLDING MACHINE

(75) Inventors: Rick G. Gosz, Oshkosh, WI (US); Mark A. Kubsh, Francis Creek, WI (US)

(73) Assignee: Patriot Universal Holdings, LLC., Hilbert, WI (US)

Reexamination Request:
No. 90/011,593, May 5, 2011

Reexamination Certificate for:
Patent No.: 7,207,789
Issued: Apr. 24, 2007
Appl. No.: 10/978,076
Filed: Oct. 28, 2004

Related U.S. Application Data

(60) Provisional application No. 60/515,097, filed on Oct. 28, 2003.

(51) Int. Cl.
*B29C 47/92* (2006.01)
*A23P 1/10* (2006.01)

(52) U.S. Cl.
USPC ........... 425/150; 425/574; 425/575; 425/572; 425/556; 426/513

(58) Field of Classification Search
None
See application file for complete search history.

(56) References Cited

To view the complete listing of prior art documents cited during the proceeding for Reexamination Control Number 90/011,593, please refer to the USPTO's public Patent Application Information Retrieval (PAIR) system under the Display References tab.

*Primary Examiner* — Norca L Torres Velazquez

(57) ABSTRACT

A mold plate drive assembly configured to provide a variable motion and fill position of the cavity of a mold plate relative to a fill position of a food product forming machine.

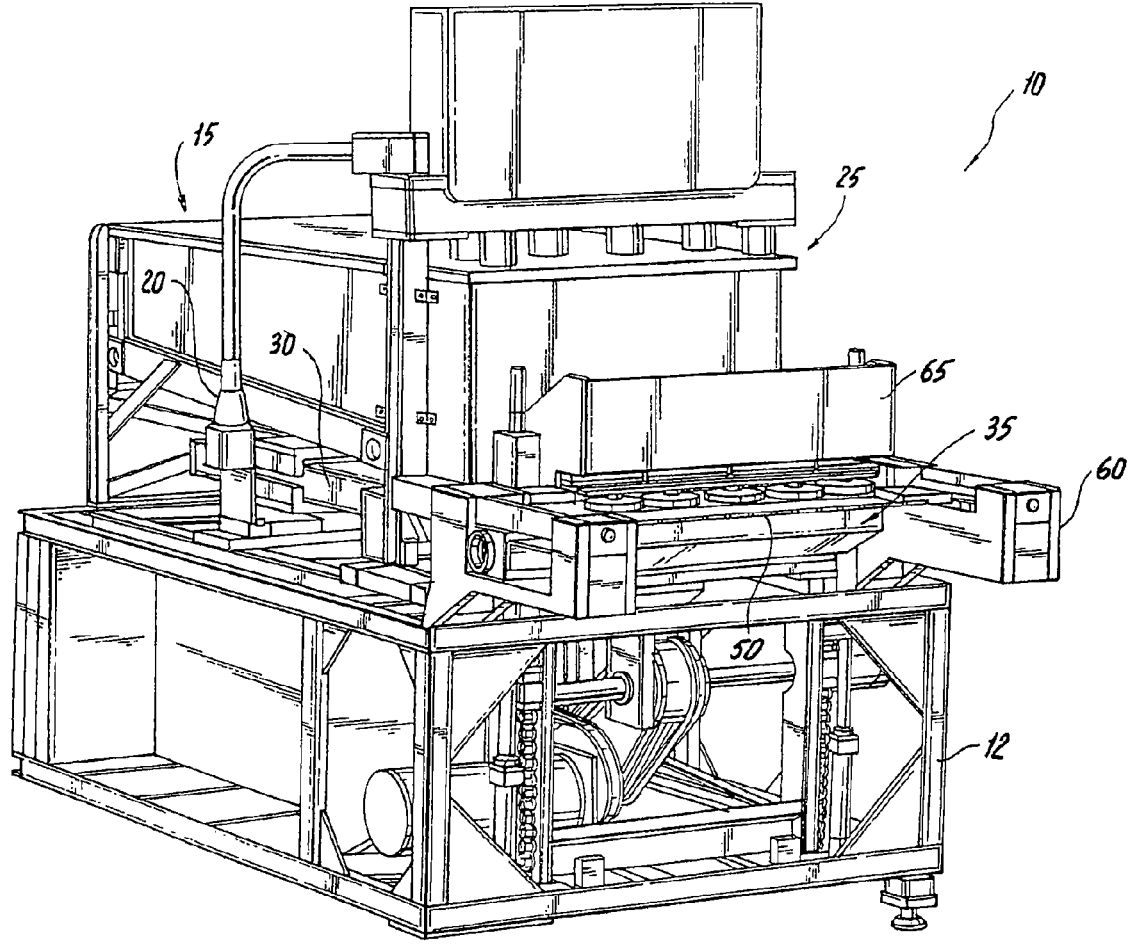

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 is confirmed.

New claims 14-16 are added and determined to be patentable.

*14. The molding machine of claim 1 wherein said small increments comprise increments of approximately 0.001 inches.*

*15. The molding machine of claim 1 wherein said controller indexes or steps the mold plate in said small increments toward a discharge position of the mold plate.*

*16. The molding machine of claim 1 wherein said controller indexes or steps the mold plate in said small increments away from a discharge position of the mold plate.*

\* \* \* \* \*